United States Patent
Corry et al.

(10) Patent No.: US 8,236,071 B2
(45) Date of Patent: Aug. 7, 2012

(54) METHODS AND APPARATUS FOR COOLING SYNGAS WITHIN A GASIFIER SYSTEM

(75) Inventors: Judeth Helen Brannon Corry, Manvel, TX (US); Yulianto Salahuddin Mohsin, Houston, TX (US)

(73) Assignee: General Electric Company, Schenectady, NY (US)

( * ) Notice: Subject to any disclaimer, the term of this patent is extended or adjusted under 35 U.S.C. 154(b) by 765 days.

(21) Appl. No.: 11/839,324

(22) Filed: Aug. 15, 2007

(65) Prior Publication Data

US 2009/0047193 A1     Feb. 19, 2009

(51) Int. Cl.
*C10J 3/76* (2006.01)

(52) U.S. Cl. ............ 48/67; 48/61; 48/127.9; 48/127.1; 48/76; 48/77; 48/69; 48/128; 48/198.3; 48/203; 122/30; 122/32; 122/504; 122/511; 122/7 R; 422/647; 422/207; 585/633

(58) Field of Classification Search ...... 48/67; 122/7 R, 122/30, 32, 511, 504
See application file for complete search history.

(56) References Cited

U.S. PATENT DOCUMENTS

| | | | |
|---|---|---|---|
| 4,054,424 A | 10/1977 | Staudinger et al. | |
| 4,444,697 A * | 4/1984 | Gater et al. | 261/118 |
| 4,479,809 A * | 10/1984 | Johnson et al. | 48/77 |
| 4,487,611 A * | 12/1984 | Ziegler | 48/69 |
| 4,520,760 A | 6/1985 | Covell | |
| 4,778,483 A | 10/1988 | Martin et al. | |
| 4,801,307 A | 1/1989 | Muenger et al. | |
| 4,808,197 A | 2/1989 | Ayers | |
| 4,828,578 A | 5/1989 | Den Bleyker | |
| 4,828,579 A | 5/1989 | Becker et al. | |
| 4,828,580 A | 5/1989 | Dach | |
| 4,880,438 A | 11/1989 | Den Bleyker | |
| 4,902,303 A | 2/1990 | Den Bleyker | |
| 5,233,943 A | 8/1993 | Martin et al. | |
| 5,464,592 A | 11/1995 | Brooker et al. | |
| 5,851,497 A | 12/1998 | Brooker et al. | |
| 2005/0132647 A1 | 6/2005 | Groen | |

FOREIGN PATENT DOCUMENTS

EP     0374323 A1     6/1990

OTHER PUBLICATIONS

International Search Report, PCT/US2008/066081, dated Apr. 2, 2009, pp. 6.

* cited by examiner

*Primary Examiner* — Kaity V. Handal
(74) *Attorney, Agent, or Firm* — Armstrong Teasdale LLP

(57) ABSTRACT

A quench ring for use with a gasifier system. The quench ring including an annular manifold having a radius, an annular channel coupled in flow communication with said manifold, and at least one inlet coupled in flow communication with said manifold, said at least one inlet having a center line aligned substantially tangentially to said annular manifold.

14 Claims, 4 Drawing Sheets in flow communication with the manifold. The at least one inlet having a center line aligned substantially tangentially to the manifold.

METHODS AND APPARATUS FOR COOLING SYNGAS WITHIN A GASIFIER SYSTEM

BACKGROUND OF THE INVENTION

This invention relates generally to syngas coolers within a gasifier system, and, more specifically, to a quench ring for use with syngas coolers.

Some known syngas coolers cool syngas, fly ash particulates, and slag within the syngas as the syngas is cooled by radiative and convective heat transfer in an array of tubes. By rapidly lowering the bulk temperature of the syngas, slag, and/or particulates, some suspended slag and/or particulates may deposit from the syngas onto tube surface. Other slag drops or particles are cooled and exit with cooled syngas from the lower section of the syngas cooler tube area. In such a boiler, solidified slag, cooled particulates, and cooled synthetic gas are removed at the lower end of a down flow syngas cooler tube area.

Other known syngas coolers use a quench system to quench the syngas, slag, and particles contained therein with a cooling fluid. Some such quench systems includes quench rings to provide a flow of water to cool a metal surface in contact with hot syngas, particulates, and/or slag as they flow through the cooler. The water cools the metal surface coming into contact with hot syngas, particulates, and slag. Some known quench rings are positioned below a quench gasifier and include multiple water channels, including a hot face channel formed by a curved hot face and baffles. Significant amounts of water are provided to the various channels of such a quench ring to ensure that the ring is continuously filled with water, such that the ring provides a substantially constant flow of water to the metal surfaces. The flow of water from such quench rings may be non-uniform to surfaces needing cooling if an insufficient amount of water is provided to the quench ring. Furthermore, the use of such quench rings may be limited by the availability of water and/or the space available to position the quench ring.

BRIEF DESCRIPTION OF THE INVENTION

In one aspect, a method for operating a syngas cooler is provided. The method includes channeling a flow of syngas into an annular cooling chamber having a longitudinal axis, injecting a cooling fluid into a manifold such that the cooling fluid is channeled substantially circumferentially about the annular cooling chamber, and discharging the cooling fluid from the manifold such that the cooling fluid contacts a surface of the cooling chamber at a predetermined angle relative to the axis of the cooling chamber.

In another aspect, a quench ring for use with a gasifier system is provided. The quench ring includes an annular manifold having a radius, an annular channel coupled in flow communication with the manifold, and at least one inlet coupled in flow communication with the manifold. The at least one inlet having a center line aligned substantially tangentially to the annular manifold.

In still another aspect, a syngas cooler is provided. The syngas cooler includes a shell and a quench section coupled within the shell. The quench section includes a first tube having a first end and a second end, and a quench chamber defined therebetween. The quench section further includes a quench ring coupled between the shell and the first tube. The quench ring configured to channel cooling fluid to the quench chamber. The quench ring includes an annular manifold having a radius, an annular channel coupled in flow communication with the manifold, and at least one inlet coupled in flow

DETAILED DESCRIPTION OF THE INVENTION

Figure 1:
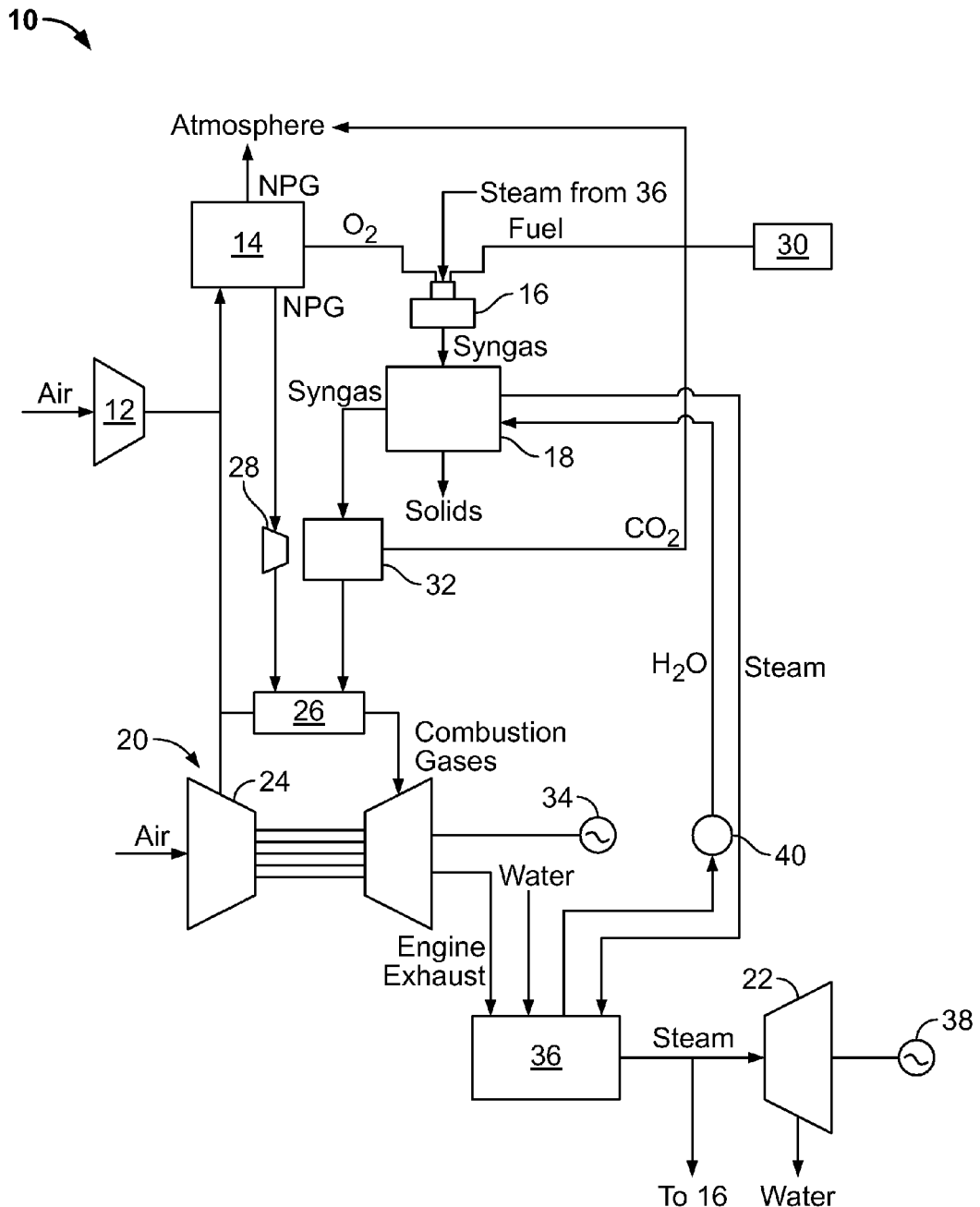
FIG. 1 is schematic view of an exemplary integrated gasification combined cycle system.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas". The $O_2$ flow is channeled to gasifier 16 for use in generating partially combusted gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at least some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide. Gasifier 16 may be a fixed-bed gasifier, a fluidized-bed gasifier, and/or a fully entrained gasifier.

In the exemplary embodiment, syngas generated by gasifier 16 is channeled to syngas cooler 18 to facilitate cooling the syngas, as described in more detail below. The cooled syngas is channeled from cooler 18 to a clean-up device 32 for cleaning the syngas before it is channeled to gas turbine engine combustor 26 for combustion thereof. Carbon dioxide ($CO_2$) may be separated from the syngas during clean-up and, in the exemplary embodiment, may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

Furthermore, in the exemplary embodiment, system 10 includes a pump 40 that supplies boiled water from steam generator 36 to syngas cooler 18 to facilitate cooling the syngas channeled from gasifier 16. The boiled water is channeled through syngas cooler 18 wherein the water is converted to steam. The steam from cooler 18 is then returned to steam generator 36 for use within gasifier 16, syngas cooler 18, and/or steam turbine 22.

Figure 2:
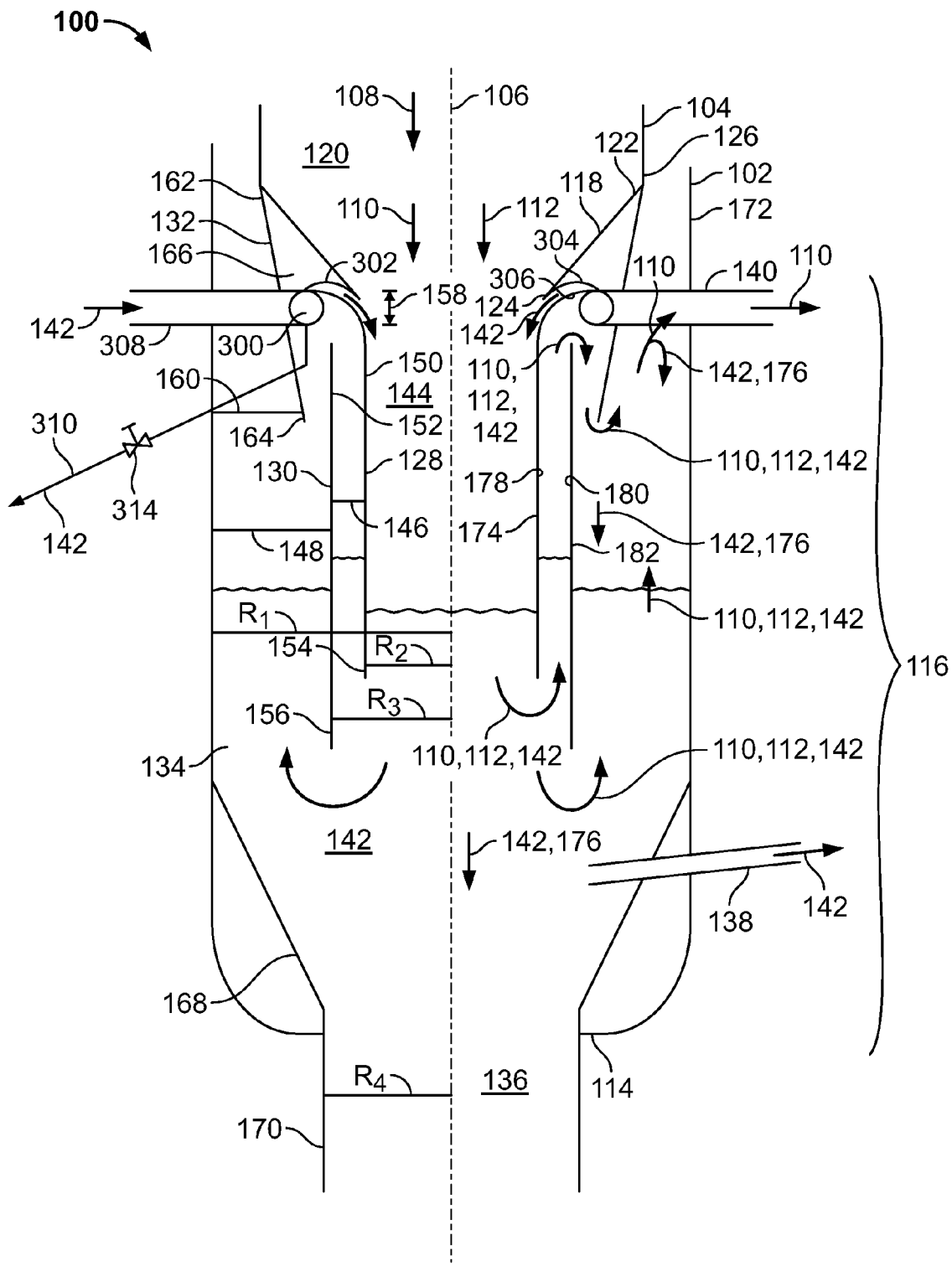
FIG. 2 is a schematic cross-sectional view of an exemplary syngas cooler that may be used with the system shown in FIG. 1.

FIG. 2 is a schematic cross-sectional view of an exemplary syngas cooler 100 that may be used with system 10. In the exemplary embodiment, syngas cooler 100 is a radiant syngas cooler. Syngas cooler 100 includes a plurality of heat exchange devices (not shown), such as a heat exchange wall 104 and/or platens (not shown), positioned within a cooler shell 102. In the exemplary embodiment, heat exchange wall 104 substantially isolates shell 102 from syngas 110 flowing within cooler 100. In the exemplary embodiment, shell 102 has a substantially circular cross-sectional shape with a longitudinal axis 106 and radius $R_1$. Alternatively, shell 102 may have any cross-sectional shape that enables cooler 100 to function as described herein. Radii, as described herein, are measured outward from longitudinal axis 106 unless otherwise defined. A main syngas flowpath 108 is defined within cooler 100 along which syngas 110 and/or particulates 112 generally flow. In the exemplary embodiment, flowpath 108 is generally aligned with axis 106. Although syngas 110 and particulates 112 are shown as separate flows, it will be understood that particulates 112 may be suspended within syngas 110 such that particulates 112 and syngas 110 have a combined flow. Furthermore, as used herein, the terms "upstream" and "downstream" are defined with respect to main syngas flowpath 108, such that a top (not shown) of cooler 100 is considered to be "upstream" from a bottom 114 of cooler 100.

Cooler 100 also includes a quench chamber 116 that is downstream from the heat exchange devices to facilitate rapidly cooling syngas 110 and/or particulates 112 suspended in syngas 110. More specifically, a lower wall 118 separates quench chamber 116 from a section 120 of cooler 100 containing the heat exchange devices therein. In one embodiment, lower wall 118 is formed from a plurality of heat exchange tubes (not shown). In another embodiment, lower wall 118 is fabricated from a refractory liner material. In the exemplary embodiment, lower wall 118 is substantially conical and tapers inward or converges from an upstream end 122 to a downstream end 124. Moreover, upstream end 122 may be coupled to, and/or positioned adjacent to, a downstream end 126 of heat exchange wall 104. Alternatively, lower wall 118 may be coupled to any other suitable component within syngas cooler 100 that enables cooler 100 to function as described herein.

In the exemplary embodiment, quench chamber 116 includes a dip tube 128, a draft tube 130, a splash plate 132, a water bath 134, a sump 136, a blowdown line 138, a syngas outlet 140, and a quench ring 300. Although water 142 is described herein as the fluid used to quench syngas 110 and/or particulates 112, any suitable non-reactive fluid may be used for quenching. In the exemplary embodiment, dip tube 128 and draft tube 130 each have a substantially circular cross-sectional shape. In other embodiments, tubes 128 and/or 130 may have any cross-sectional shape that enables cooler 100 to function as described herein. In the exemplary embodiment, dip tube 128 and draft tube 130 are concentrically aligned with axis 106. More specifically, dip tube 128 has a radius $R_2$ and draft tube 130 has a radius $R_3$, wherein radius $R_2$ is shorter than radius $R_3$. In addition, radius $R_3$ is shorter than radius $R_1$. As such, a primary quench zone 144 is defined within dip tube 128, a first gap 146 is defined between dip tube 128 and draft tube 130, and a second gap 148 is defined between draft tube 130 and shell 102. Moreover, in the exemplary embodiment, an upstream end 150 of dip tube 128 is upstream of an upstream end 152 of draft tube, and a downstream end 154 of dip tube 128 is upstream from a downstream end 156 of draft tube 130. Each of the upstream ends 150 and 152 are positioned proximate to lower wall 118, and each downstream end 154 and 156 extends into water bath 134. In the exemplary embodiment, a third gap 158 is defined between dip tube upstream end 150 and lower wall downstream end 124.

In the exemplary embodiment, splash plate 132 is generally annular and extends through gap 148 about draft tube 130. Although splash plate 132 has a substantially circular cross-sectional shape in the exemplary embodiment, alternatively, splash plate 132 may have any cross-sectional shape that enables cooler 100 to function as described herein. A fourth gap 160 is defined between splash plate 132 and shell 102. More specifically, splash plate 132 converges from an upstream end 162 to a downstream end 164 such that plate 132 is at least partially conical. In alternative embodiments, splash plate 132 may be substantially cylindrical and/or may diverge from end 162 to end 164. Splash plate 132 is fabricated from any material that facilitates condensing water 142 suspended in flow of syngas 110. Plate 132 collects the water 142 that is condensed, such that substantially dry syngas 110 is discharged from cooler 100. Splash plate 132 also facilitates the precipitation of particulates 112 from syngas 110, such that particulates 112 fall into water bath 134 after contacting splash plate 132.

In the exemplary embodiment, splash plate upstream end 162 is coupled to heat exchange wall downstream end 126 and/or to lower wall upstream end 122. In an alternative embodiment, splash plate 132 is positioned adjacent to, but not coupled to heat exchange wall end 126 and/or lower wall end 122. Accordingly, a chamber 166 is defined by lower wall 118, splash plate 132, and dip tube 128. Splash plate downstream end 164 extends downstream into second gap 148 and past draft tube upstream end 152, such that draft tube upstream end 152 extends into chamber 166.

In the exemplary embodiment, quench ring 300, as described in more detail below, is coupled within chamber 166 such that an outlet channel 302 of quench ring 300 extends at least partially through third gap 158. More specifically, an outer wall 304 of channel 302 is positioned proximate to lower wall 118, an inner wall 306 of channel 302 is proximate to dip tube 128, and quench ring 300 is upstream from draft tube end 152. In one embodiment, either channel wall 304 and/or 306 is coupled to lower wall downstream end 124 and/or to dip tube upstream end 150, respectively. Further, an inlet tube 308, as described in more detail below, of quench ring 300 extends from quench ring 300 through shell 102. Inlet tube 308 may be coupled to a sump (not shown), a quench water supply (not shown), and/or any other suitable component that enables cooler 100 to function as described herein. In the exemplary embodiment, inlet 308 extends from shell 102, around splash plate 132, to quench ring 300, such that inlet 308 is spaced from splash plate 132. More specifically, inlet 308 is adjacent to splash plate downstream end 164. In another embodiment, inlet tube 308 extends from shell 102 to quench ring 300 through splash plate 132. Moreover, in the exemplary embodiment, a drain line 310, as described in more detail below, of quench ring 300 extends from quench ring 300 through shell 102 to blowdown (not shown), a sump (not shown), a nozzle 312 (shown in FIG. 3), and/or any other suitable component and/or location that enables cooler 100 to function as described herein. In one embodiment, drain line 310 also extends through splash plate 132. Although only one valve 314 is illustrated as being coupled to drain line 310, it should be understood drain line 310 may include any other suitable components coupled thereto.

Water bath 134 includes, in the exemplary embodiment, water 142, sump 136, and blowdown line 138. Although water bath 134 is shown and described as having water 142 therein, water bath 134 may not include water 142 and still be considered to be a "water bath." Rather water bath 134 is a portion of quench chamber 116 that is configured to retain water 142 therein. In the exemplary embodiment, dip and draft tubes 128 and 130 are each at least partially submerged in water 142 within water bath 134. As such, water 142 at least partially fills first and second gaps 146 and 148 and primary quench zone 144.

In the exemplary embodiment, because of pressure differences within quench chamber 116, the level of water 142 within first gap 146 is higher than the level of water 142 within second gap 148 and/or primary quench zone 144. Moreover, the level of water 142 within second gap 148 is higher than the level of water 142 within primary quench zone 144. Downstream from dip and draft tube ends 154 and 156, respectively, sump 136 is defined within water bath 134. More specifically, sump includes a collection cone 168 coupled within shell 102 and a cylindrical sump outlet 170 that extends through shell bottom 114. In the exemplary embodiment, cylindrical sump outlet 170 has a radius $R_4$ that is shorter than cooler shell radius $R_1$. Sump outlet 170 may be coupled to a lockhopper (not shown), a pump (not shown), and/or any other wet particulate removal device that enables system 10 to function as described herein. In the exemplary embodiment, blowdown line 138 extends from within water bath 134 through shell 102, and is configured to regulate the level of water 142 within water bath 134. In one embodiment, blowdown line 138 is coupled to a sump (not shown), a water holding device (not shown), and/or any other suitable component and/or location that enables system 10 to function as described herein.

In addition, in the exemplary embodiment, quench chamber 116 includes at least one syngas outlet 140 that extends through a side wall 172 of shell 102. Syngas outlet 140 may be coupled to gas turbine engine 20 (shown in FIG. 1), cleanup device 32 (shown in FIG. 1), and/or any other suitable component that enables system 10 to function as described herein.

In the exemplary embodiment, outlet 140 is positioned within fourth gap 160 and is upstream from splash plate downstream end 164.

During operation of system 10, water 142 is channeled through inlet 308 and into quench ring 300 for discharge through channel 302, as described in more detail below. Water 142 discharged through channel 302 flows along an inner wall 174 of dip tube 128 and into water bath 134. Water 142 may also be discharged from quench ring 300 through drain line 310 to regulate the amount of water 142 within quench ring 300, as described below. The level of water 142 in water bath 134 may be regulated by controlling water discharge through blowdown line 138 and/or sump outlet 170.

During system operation, syngas 110 with particulates 112 is channeled from gasifier 16 to cooler 100. Syngas 110 with particulates 112 flows through the heat exchange devices within cooler 100 and into quench chamber 116. More specifically, the lower wall 118 of cooler 100 channels the syngas 110 with particulates 112 into primary quench zone 144, wherein the syngas 110 with particulates 112 flows past the downstream end 124 of lower wall 118 and along the wetted inner wall 174 of dip tube 128. As such, when molten particulates 112 contact water 142 on inner wall 174, particulates 112 are cooled from a molten state to a solid state and are thus prevented from becoming highly viscose and depositing on inner wall 174 and/or other components within cooler 100. Solidified particulates 112 are referred to herein as slag 176. Slag 176 formed in primary quench zone 144 falls into water bath 134 and is discharged from cooler 100 through sump 136. Syngas 110 and remaining particulates 112 enter water bath 134 wherein some of remaining particulate 112 is transformed into slag 176 that is then discharged from cooler 100. The flow of syngas 110 with suspended particulate 112 is reversed at dip tube downstream end 154 and is channeled into at least one of gaps 146 and/or 148. In the exemplary embodiment, suspended particulate 112 exiting water bath 134 are at a lower temperature than particulate 112 entering water bath 134.

Syngas 110, particulate 112, and/or water 142 channeled through first gap 146 enters chamber 166, reverses flow direction at draft tube upstream end 150, and is discharged into second gap 148. In the exemplary embodiment, at least some of the particulate 112 is transformed into slag 176 as the flow reverses direction, and then falls into water bath 134 for discharge through sump 136. Moreover, at least some water 142 condenses on an outer wall 178 of dip tube 128 and/or an inner wall 180 of draft tube 130 to wet walls 178 and/or 180 to facilitate preventing the deposit of slag 176 on walls 178 and/or 180. Another portion of water 142 channeled through first gap 146 condenses on splash plate 132 when flow enters second gap 148. Water 142 condensing on walls 178 and/or 180 and/or on splash plate 132 is returned to water bath 134. Moreover, at least some syngas 110, which is substantially without particulate 112 and/or water 142, is channeled from second gap 148 through syngas outlet 140 for use within system 10.

Furthermore, in the exemplary embodiment, at least some of the particulate 112 channeled through second gap 148 is transformed into slag 176, which falls into water bath 134 for discharge through sump 136. At least some other particulate 112 contacts splash plate 132 and is precipitated from syngas 110 into water bath 143 for discharge from cooler 100 as slag 176. Further, at least some water 142 channeled to second gap 148 condenses on an outer wall 182 of draft tube 130 to wet wall 182 to facilitate preventing slag 176 build-up on wall 182. Such condensed water 142 flows down wall 182 and is returned to water bath 134. Another portion of water 142 condenses on splash plate 132 and is returned to water bath 134. The remaining syngas 110 is substantially without particulate 112 and/or water 142 and is discharged from cooler 100 through syngas outlet 140 for use within system 10.

Figure 3:
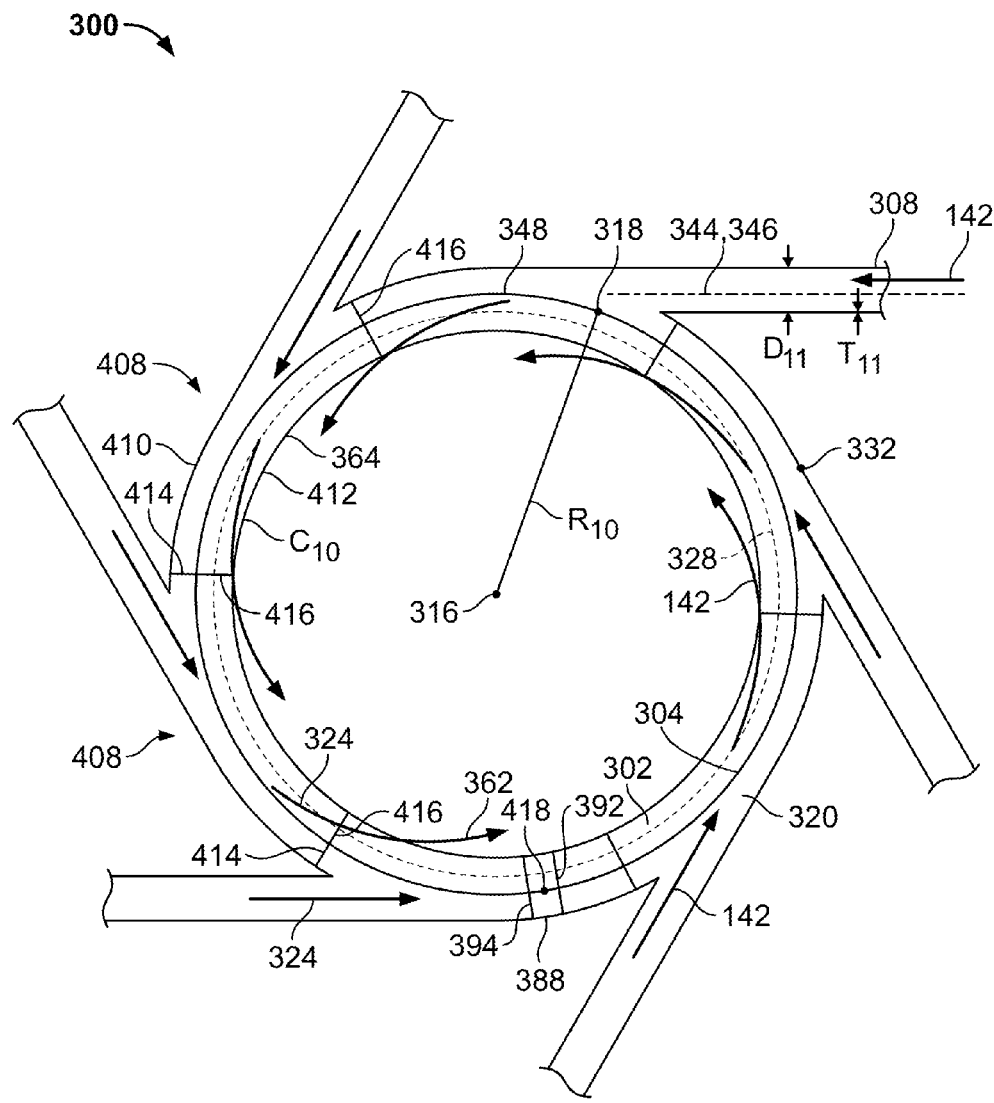
FIG. 3 is a top view of an exemplary quench ring that may be used with the syngas cooler shown in FIG. 2.
Figure 4:
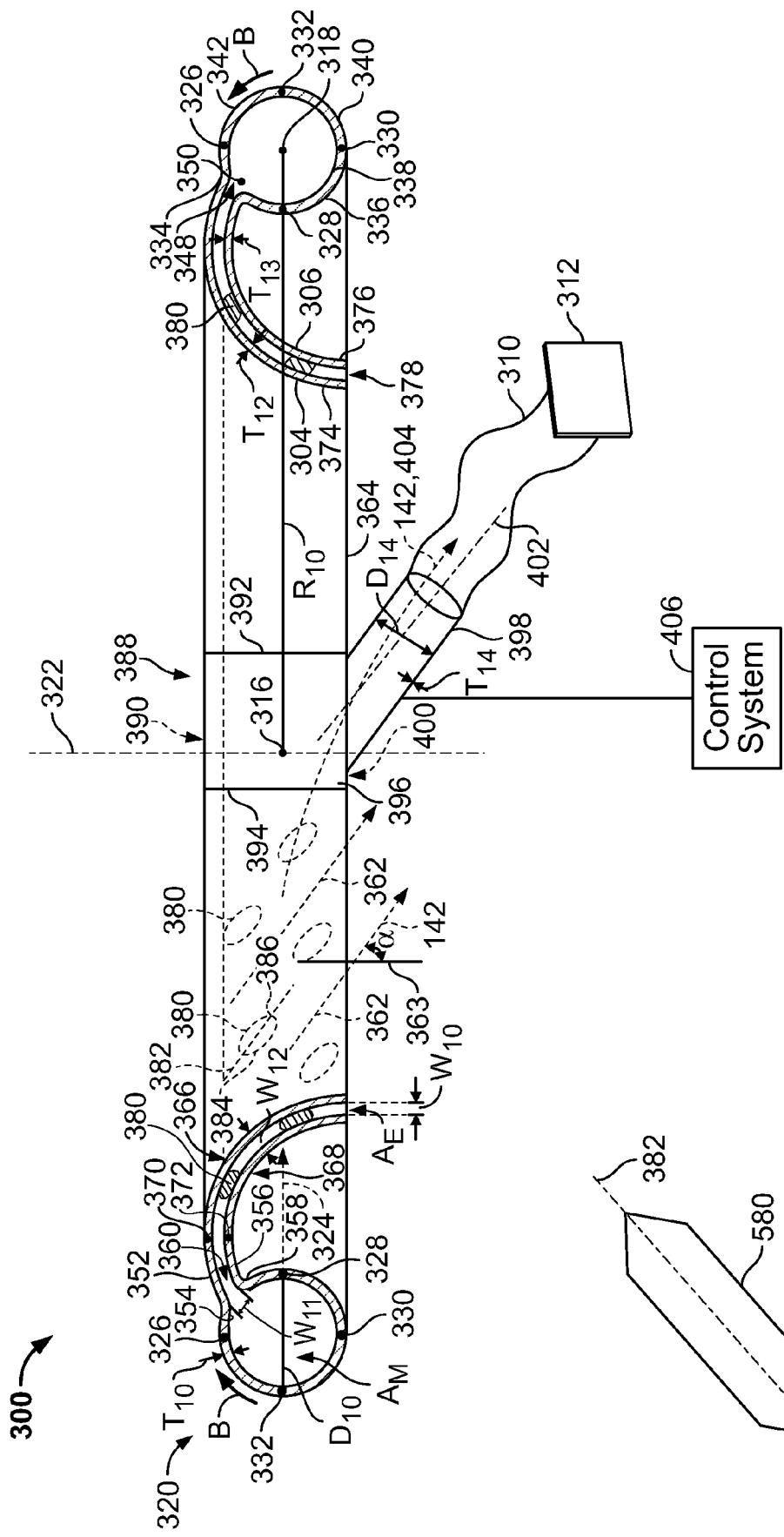
FIG. 4 is a cross-sectional view of the quench ring shown in FIG. 3.

FIG. 3 is a top view of an exemplary quench ring 300 that may be used with syngas cooler 100. FIG. 4 is a cross-sectional view of quench ring 300. In the exemplary embodiment, quench ring 300 has a radius $R_{10}$ that is measured from a center point 316 of quench ring 300 to a center point 318 of a manifold 320, as described in more detail below. Radius $R_{10}$ is selected based on dip tube radius $R_2$. In alternative embodiments, radius $R_{10}$ is selected to enable quench ring 300 to function as described herein. Quench ring center point 316 is aligned such that a center axis 322 (shown in FIG. 4) of quench ring is generally co-axially aligned with cooler axis 106. As such, radius $R_{10}$ is substantially perpendicular to cooler axis 106 and is substantially parallel to radius $R_1$. Alternatively, quench ring axis 322 may be at any other orientation relative to cooler axis 106.

In the exemplary embodiment, quench ring 300 includes a continuous, annular manifold 320 having a flowpath 324 defined therethrough. Although in the exemplary embodiment, manifold 320 has a substantially circular cross-sectional shape, defined by an inner diameter $D_{10}$, manifold 320 may have any cross-sectional shape that enables quench ring 300 to function as described herein. In one embodiment, manifold diameter $D_{10}$ is approximately equal to four inches. In another embodiment, manifold diameter $D_{10}$ is approximately equal to eight inches, although manifold diameter D10 may be any suitable size for the design of the quench system and the applicable scaling rule. In the exemplary embodiment, manifold 320 is fabricated from schedule (SCH) 40 pipe, such as, but not limited to, SCH 40 steel pipe, such that manifold has a nominal thickness $T_{10}$ based on the diameter $D_{10}$ and the American National Standards Institute's (ANSI) standards for Schedule 40 pipe dimensions. Alternatively, manifold 320 is fabricated from any other suitable material and/or any other suitable Schedule that enables quench ring 300 to function as described herein. In other embodiments, manifold dimensions, such as, diameter $D_{10}$ and/or thickness $T_{10}$, are selected to enable quench ring 300 to function as described herein. For example, thickness $T_{10}$ is selected based on a preferred weight for quench ring 300, and diameter $D_{10}$ is selected using a scaling rule, such as, for example, a rule that a cross-sectional area $A_M$ of manifold 320 is approximately three times an exit area $A_E$ of channel 302 per inlet. Notably, the cross-sectional exit area $A_E$ is calculated by multiplying a channel outlet width $W_{10}$ by a channel outlet circumference $C_{10}$.

Manifold 320 includes a top point 326, an inner point 328, a bottom point 330, and an outer point 332. A first portion 334 of manifold 320 is defined along a surface 336 of manifold 320 in a B direction from top point 326 to inner point 328. A second portion 338 of manifold 320 is defined along surface 326 in the B direction from inner point 328 to bottom point 330. A third portion 340 of manifold 320 is defined along surface 336 in the B direction from bottom point 330 to outer point 332, and a fourth portion 342 of manifold 320 is defined along surface 336 in the B direction from outer point 332 to top point 326. In the exemplary embodiment, each portion 334, 338, 340, and 342 is inclusive of respective points 326, 328, 330, and/or 332.

Further, in the exemplary embodiment, quench ring 300 includes at least one inlet 308 that is coupled to manifold 320 such that inlet 308 extends substantially tangentially from quench ring 300. More specifically, a center line 344 of inlet 308 is substantially aligned with a tangent line 346 of quench ring 300, wherein the tangent line 346 extends tangentially from a point, such as point 318, on a circle (not shown) with a radius approximately equal to quench ring radius $R_{10}$. As such, the tangent line 346 is substantially perpendicular to radii $R_1$ and $R_{10}$ and to axes 106 and 322. Although only one inlet 308 is described herein, it should be understood that each inlet illustrated in FIG. 3 has a substantially similar configuration as inlet 308. In the exemplary embodiment, quench ring 300 includes six inlets 308 that are spaced substantially equidistant about quench 300 at radius $R_{10}$. In alternative embodiments, quench ring 300 may include two or four inlets 308. In another embodiment, quench ring 300 includes any number of tangential inlets 308 at any relative location that enables quench ring 300 to function as described herein.

In the exemplary embodiment, inlet 308 is fabricated from SCH 80 steel pipe having a four inch inner diameter $D_{11}$ and a thickness $T_{11}$ that is based on ANSI standards for diameter $D_{11}$. In one embodiment, manifold $D_{11}$ is smaller than inlet diameter $D_{10}$, a tapered fitting (not shown) is coupled between manifold 320 and inlet 308. Such a fitting facilitates reducing the diameter of inlet 308 to correspond with manifold diameter $D_{10}$ and also facilitates increasing the velocity of water 142 flowing through the decreased cross-sectional area (not shown) of inlet 308. In another embodiment, inlet diameter $D_{11}$ is approximately that same size as manifold diameter $D_{10}$ such that inlet 308 may be directly coupled to manifold 320. Alternatively, the material of inlet 308 and/or the dimensions of inlet 308, such as, but not limited to, diameter $D_{11}$ and/or thickness $T_{11}$, may be of any dimensions that enable quench ring 300 to function as described herein.

In the exemplary embodiment, quench ring 300 includes continuous channel 302 that extends from manifold 320. More specifically, channel 302 is coupled to manifold 320 at a slit 348 defined within manifold 320. In the exemplary embodiment, slit 348 is defined in first portion 334 of manifold 320. In another embodiment, slit 348 is defined in manifold 320 such that a mid point 350 of slit 348 is substantially aligned with top point 326 of manifold 320. Alternatively, slit 348 may be defined in any manifold portion 338, 340, and/or 342 that enables quench ring 300 to function as described herein. In the exemplary embodiment, slit 348 has a width $W_{11}$ that is approximately equal to 0.25 inches. Alternatively, slit width $W_{11}$ is selected to enable quench ring 300 to function as described herein. For example, in one embodiment, slit width $W_{11}$ is selected to facilitate reducing frictional forces between quench ring 300 and water 142.

Channel 302 includes outer wall 304 and inner wall 306, as described herein. A first end 352 of outer wall 304 is coupled to an outer edge 354 of slit 348, and a first end 356 of inner wall 306 is coupled to an inner edge 358 of slit 348, such that a gap 360 is defined between inner and outer walls 304 and 306. In the exemplary embodiment, walls 304 and 306 each have a respective thickness $T_{12}$ and $T_{13}$. Thicknesses $T_{12}$ and $T_{13}$, in the exemplary embodiment, are approximately that same size as manifold thickness $T_{10}$. Alternatively, thicknesses $T_{12}$ and/or $T_{13}$ may be sized differently than thickness $T_{10}$. Walls 304 and 306 define a channel flowpath 362 therebetween. In the exemplary embodiment, channel flowpath 362 is obliquely aligned with respect to a downstream edge 364 of channel 302, wherein edge 364 is substantially aligned with channel circumference $C_{10}$. In the exemplary embodiment, flowpath 362 is oriented at an angle α to a line 363 that is substantially parallel to axes 106 and 322. As such, flowpath 362 is oriented at an angle α to axes 106 and 322. Angle α may be any suitable angle, for example, a predetermined acute angle that enables quench ring 300 to function as described herein. In the exemplary embodiment, channel flowpath 362 is at least partially dependent on the configuration of inlet 308 and flow characteristics, such as, for example, mass flow rate, turbulence, velocity, and/or purity, of water 142 within inlet 308 and/or manifold 320.

Each wall 304 and 306 includes an arcuate portion 366 and 368, respectively, that enables water 142 to be directed from slit 348 downwardly towards dip tube inner wall 174 (shown in FIG. 2). In the exemplary embodiment, each arcuate portion 366 and 368 has a respective apex 370 and 372 that are each upstream, with respect to cooler flowpath 108 (shown in FIG. 2), from the inner and outer edges 354 and 358, respectively, of slit 348. In the exemplary embodiment, arcuate portions 366 and 368 facilitate preventing the formation of recirculation zones (not shown) within quench ring 300. Alternatively, arcuate portions 366 and/or 368 may be any suitable configuration based on the configuration of cooler 100, and more specifically, the locations of lower wall 118, dip tube 128, and/or draft tube 130 (shown in FIG. 2).

A second end 374 of outer wall 304 and a second end 376 of inner wall 306 define a channel outlet 378 having a width $W_{10}$. More specifically, in the exemplary embodiment, width $W_{10}$ is approximately equal to 0.25 inches. In other embodiments, width $W_{10}$ is selected based on the quality of water 142, the size of gap 158 between dip tube upstream end 150 and lower wall end 124 (shown in FIG. 2), a predetermined channel flowpath 362, and/or any suitable basis that enables quench ring 300 to function as described herein. In the exemplary embodiment, width $W_{10}$ is narrower than slit width $W_{11}$ such that walls 304 and 306 converge towards each other from ends 352 and 356 to ends 374 and 376 along channel 302. As such, gap 360 narrows in the downstream direction of channel flowpath 362. Further, in the exemplary embodiment, channel circumference $C_{10}$ is defined by outer wall end 374.

In the exemplary embodiment, quench ring 300 also includes a plurality of spacers 380. In an alternative embodiment, quench ring 300 does not include spacers 380. In another embodiment, quench ring 300 includes any number of spacers 380 that enables quench ring 300 to function as described herein. In the exemplary embodiment, spacers 380 are coupled within channel 302 using, for example, welding, bolting, and/or any other suitable fastening mechanism that enables quench ring 300 to function as described herein. In one embodiment, spacers 380 are coupled to a quench ring mounting bracket (not shown) or baffle (not shown) within cooler 100 and extend from the bracket into channel 302. Spacers 380 are coupled within channel 302 such that a width $W_{12}$ of channel gap 360 is prevented from fluctuating during cooler operation.

Figure 5:
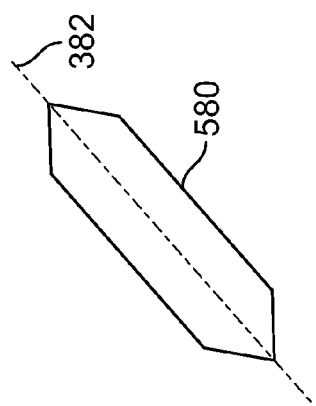
FIG. 5 is a side view of an exemplary spacer that may be used with the quench ring shown in FIG. 3.

In the exemplary embodiment, spacers 380 have a generally elongated shape central about a longitudinal axis 382. For example, spacer 380 may be a polygon-shaped spacer 580, as shown in FIG. 5, an oval and/or elliptical-shaped spacer, a triangle-shaped spacer, a parallelogram-shaped spacer, and/or any other shape that enables quench ring 300 to function as described herein. Spacer 380 is aligned within channel 302 such that longitudinal axis 382 is generally aligned with the flowpath 362 of water 142 discharged through channel 302. Each end 384 and 386 of spacer 380 is generally aligned with the water flowpath 362 and/or a water swirl pattern (not shown) such that a predetermined flow pattern is induced to water 142 flowing through channel 302. A first end 384 of spacer 380 is configured to split the flow of water 142 into a generally laminar flow pattern around spacer 380. A second end 386 of spacer 380 is configured to enable the flow to converge downstream from spacer 380 without inducing turbulence to the flow. In an alternative embodiment, spacers 380 are aligned such that longitudinal axis 382 is substantially perpendicular to channel downstream edge 364. In another embodiment, the orientation of spacer 380 with respect to channel 302 is selected to induce a predetermined flow pattern to water 142 being discharged through channel 302.

In the exemplary embodiment, quench ring 300 also includes a drain portion 388. In alternative embodiments, quench ring 300 may have more or less than one drain portion 388. Drain portion 388 includes a manifold section 390 that extends between a first end 392 and a second end 394 of drain portion 388, a channel section 396 that extends from first end 392 to second end 394, and a drain outlet 398 extending from a bottom surface 400 of manifold section 390 of drain portion 388. Manifold section 390 is designed to be coupled within quench ring 300 without substantially affecting flowpath 324 through quench ring manifold 320. Drain portion channel section 396 is substantially similar to channel 302, as described herein, such that drain portion 388 may be coupled within quench ring 300 without substantially affecting channel flowpath 362.

Drain outlet 398 has a diameter $D_{14}$ and a thickness $T_{14}$. In the exemplary embodiment, diameter $D_{14}$ is approximately equal to two inches, however, drain outlet 398 may have any suitable diameter $D_{14}$ that enables quench ring 300 to function as described here. In the exemplary embodiment, drain outlet 398 has a longitudinal axis 402 that is substantially aligned with manifold flowpath 342. Alternatively, longitudinal axis 398 may have any suitable orientation with respect to manifold section 390 and/or quench ring 300 that enables quench ring 300 to function as described herein. Drain outlet 398 is configured to remove water 142 and/or solids 404 from quench ring 300. Moreover, drain outlet 398 may channel water 142 and/or solids 404 to, for example, drain line 310, nozzle 312, a blowdown (not shown), a sump (not shown), and/or to any other suitable component and/or location that enables system 10 to function as described herein. In the exemplary embodiment, water 142 and/or solids 404 are channeled from drain outlet 398 through line 310, to nozzle 312 for discharge from cooler 100 through shell 102 (shown in FIG. 2). In one embodiment, drain portion 388 is coupled to a control system 406 that may include, for example, valves, such as valve 314, actuators (not shown), a computer system (not shown), and/or any other suitable components. Control system 406 regulates the amount of water 142 within quench ring 300, regulates the removal of solids 404 from quench ring 300, and/or controls the operation of quench ring 300.

In the exemplary embodiment, quench ring 300 is fabricated from a plurality of segments 408, as shown in FIG. 3. Each quench ring segment 408 includes a manifold segment 410, a channel segment 412, and one tangential inlet 308. Alternatively, at least one of segments 408 may include more or less than one inlet 308. Each segment 408 also includes a first end 414 and a second end 416. In the exemplary embodiment, each segment 408 is arcuate such that, when assembled, segments 408 form quench ring 300. Segments 408 are coupled circumferentially together using for example, welding, mechanical fasteners (not shown), and/or any other suitable fastening mechanism, to form quench ring 300. More specifically, a first end 414 of one segment 408 is coupled to the second end 416 of an adjacent segment 408. In the exemplary embodiment, drain portion 388 is coupled within one segment 408, using, for example, but not limited to, welding, mechanical fasteners (not shown), and/or any other suitably fastening mechanism. More specifically, in the exemplary embodiment, drain portion 388 is coupled generally at a mid-point 418 of segment 408. In another embodiment, drain portion 388 is coupled between adjacent segments 408 such that the first end 392 of drain portion 388 is coupled to the second end 416 of one segment 408, and such that the second end 394 of drain portion 388 is coupled to the first end 414 of another segment 408.

During operation, water 142 is injected into quench ring 300 through inlets 308. In the exemplary embodiment, the mass flow rate of water 142 entering inlets 308 and/or quench ring 300 is determined based on the evaporation rate of water 142 as it interacts with syngas 110 and/or to facilitate minimizing the volume of water 142 within quench ring 300 without substantially affecting the water coverage on dip tube inner wall 174 (shown in FIG. 2). Furthermore, in the exemplary embodiment, the tangential orientation of inlets 308 forces water 142 to flow substantially circumferentially about manifold 320. Because water 142 enters manifold 320 along tangent line 346, the flow of water 142 within quench ring 300 continues to have a turbulent flow about quench ring 300 substantially without a pressure drop. As a result, recirculation zones are facilitated to be prevented from forming within manifold 320 and quench ring 300.

When water 142 reaches a predetermined level within manifold 320, for example, a steady-state full condition, water 142 is discharged from manifold 320 through slit 348 while maintaining the induced angular flow 324 and/or 362 and/or without substantially altering flowpath 324. As such, water 142 enters channel 302 generally along a channel flowpath 362 that is obliquely aligned with manifold center axis 322 and/or outer edge 364. The flow of water 142 within channel 302 may be directed by spacers 380 within channel 302 before being discharged from channel 302, and consequently, quench ring 300. Water 142 is discharged from quench ring 300 through channel outlet 378 such that the water 142 is discharged from substantially all of exit area $A_E$ and onto dip tube inner surface 174. Discharged water 142 continues to flow in an orientation such that at least a portion of water flowpath (not shown) on inner surface 174 is generally obliquely aligned with respect to cooler centerline 106. Such quench water flow characteristics facilitate coating substantially all of inner surface 174 with a continuous flow of water 142, which facilitates preventing slag 176 from depositing thereon.

Further, during an operation of cooler 100, control system 406 may be used to discharge water 142 from quench ring 300 through drain portion 388 to regulate the water flow characteristics, such as, flow rate of water 142, during quench ring operation. Furthermore, control system 406 may be used to discharge water 142 from quench ring 300 through drain portion 388 to regulate the water flow characteristics, such as, level and/or volume of water 142, during a maintenance operation. More specifically, during quench rig operation and/or maintenance operation, water 142 is discharged from manifold 390 through drain outlet 398 to a location (not shown) external of cooler shell 102 or to a sump (not shown) of cooler shell 102 through an external nozzle (not shown). During another operation of cooler 100, control system 406 may be used to discharge solids 404 from quench ring 300 through drain outlet 398 to facilitate preventing the accumulation of solids 404 within quench ring 300. More specifically, solids are discharged from manifold 390 through drain outlet 398 to a location (not shown) external of cooler shell 102. Although only quench ring and maintenance operations are described herein, control system 406 and/or drain portion 388 may be used during any suitable operations that enable system 10 (shown in FIG. 1) to function as described herein.

The above-described quench ring and methods of using the quench ring provide a more constant and uniform flow of water to the dip tube within a syngas cooler as compared to at least some known quench rings. Such water application facilitates preventing the deposits of solids, such as slag, on hot metal components in contact with the syngas. As such, the quench ring described herein facilitates cleaning the syngas flowing through the heat-recovering cooler by facilitating removing solids from the syngas by quenching the syngas. Furthermore, within the gap defined between the dip and draft tubes, the two-phase flow of syngas and water facilitates continuously wetting dip and draft tube surfaces that define the gap to facilitate preventing the deposition of solids thereon. Additionally, because of the simplified design as compared to known quench rings, the quench ring described herein facilitates reducing fabrication time and/or costs, and also facilitates reducing the volume of space within the syngas cooler that the quench ring occupies.

The above-described quench ring inlets facilitate providing a constant and uniform water flow to the manifold and/or channel. The inlets enable the water within the manifold to have a generally tangential and/or circumferential flow that facilitates preventing "dead" zones and/or other undesirable flow patterns within the quench ring. Furthermore, the slit within the manifold, the channel, and the channel outlet also facilitate preventing such undesirable flow patterns from forming. Moreover, the above-described spacers facilitate preventing solids in the quench water from settling within the channel, which in turn facilitates preventing the quench ring from becoming clogged and/or plugged with such solids, or from depositing on the dip tube as the solids are discharged from the quench ring. The spacers also facilitate reducing the undesirable flow patterns, such as recirculation zones, that may form within at least some known quench rings. Additionally, the spacers described herein facilitate providing a desired flow pattern, such as a generally swirled flow, within the channel and/or the channel outlet. The above-described bottom drain facilitates regulating the flow of water within and/or discharging from the quench ring, and also facilitates purging the quench ring of solids in the quench water that may have deposited within the quench ring.

Exemplary embodiments of quench rings for use with a syngas cooler are described above in detail. The quench rings are not limited to the specific embodiments described herein, but rather, components of each quench ring may be utilized independently and separately from other components described herein. Each quench ring may also be used in combination with other syngas coolers and/or quenching systems, and is not limited to practice with only the syngas cooler as described herein. Rather, the present invention can be implemented and utilized in connection with many other quenching applications. For example, each quench ring may be used not only with a radiant syngas cooler, but may also be used with a quench gasifier reactor.

While the invention has been described in terms of various specific embodiments, those skilled in the art will recognize that the invention can be practiced with modification within the spirit and scope of the claims.

What is claimed is:

1. A quench ring for use with a gasifier system, said quench ring comprising:

an annular manifold having a radius sized to extend about a portion of a syngas flowpath defined within the gasifier system, said manifold oriented such that the syngas flowpath is substantially perpendicular to cooling fluid flow within said manifold;

an annular channel coupled in flow communication to said annular manifold via a slit, said annular channel including an outer wall coupled to an outer edge of said slit, said annular channel extending radially inward from said annular manifold, wherein said outer wall includes an arcuate portion having an apex that is upstream of said slit outer edge with respect to the syngas flowpath; and a plurality of inlets coupled in flow communication with said manifold, each of said plurality of inlets having a center line aligned substantially with a tangent line of said quench ring, said plurality of inlets oriented in the same plane as said annular manifold, such that cooling fluid is discharged into said manifold in a direction that is substantially perpendicular to the syngas flowpath, said plurality of inlets coupled circumferentially around said annular manifold.

2. A quench ring in accordance with claim 1 further comprising a drain section coupled to at least said manifold.

3. A quench ring in accordance with claim 1 further comprising at least one spacer coupled within said channel.

4. A quench ring in accordance with claim 3 wherein said at least one spacer has a longitudinal axis that is aligned substantially parallel to a flow path defined within said channel.

5. A quench ring in accordance with claim 1 wherein said quench ring further comprises a plurality of inlets spaced substantially equidistantly about said manifold.

6. A quench ring in accordance with claim 1 wherein at least one inlet is configured to induce a substantially tangential cooling fluid flowpath from said quench ring.

7. A quench ring in accordance with claim 1 wherein a cross-section of said channel is at least partially arcuate.

8. A syngas cooler comprising:
a shell; and
a quench section coupled within said shell, said quench section comprising:
a first tube comprising a first end and a second end and a quench chamber defined therebetween; and
a quench ring coupled between said shell and said first tube, said quench ring configured to channel cooling fluid to said quench chamber, said quench ring comprising:
an annular manifold having a radius sized to extend about a portion of a syngas flowpath defined within said quench section, said manifold oriented such that the syngas flowpath is substantially perpendicular to cooling fluid flow within said manifold;
an annular channel coupled in flow communication to said annular manifold via a slit, said annular channel including an outer wall coupled to an outer edge of said slit, said annular channel extending radially inward from said annular manifold, wherein said outer wall includes an arcuate portion having an apex that is upstream of said slit outer edge with respect to the syngas flowpath; and
a plurality of inlets coupled in flow communication with said manifold, said plurality of inlets having a center line aligned substantially with a tangent line of said quench ring, said plurality of inlets oriented in the same plane as said annular manifold, such that cooling fluid is discharged into said manifold in a direction that is substantially perpendicular to the syngas flowpath, said plurality of inlets coupled circumferentially around said annular manifold.

9. A system in accordance with claim 8 further comprising a fluid retention chamber coupled in flow communication with said quench chamber, said tube second end extending at least partially into said fluid retention chamber.

10. A system in accordance with claim 8 further comprising a second tube coupled within said quench section such that a gap is defined between said first and second tubes.

11. A system in accordance with claim 8 further comprising a condensation plate coupled between said quench ring and said shell.

12. A system in accordance with claim 8 wherein said syngas cooler further comprises a heat exchange chamber defined within said shell, and wherein said annular channel further comprises a second wall, said outer wall is proximate a lower wall of said heat exchange chamber and said second wall is proximate said first end of said first tube.

13. A system in accordance with claim 12 wherein said annular channel extends at least partially into a gap defined between said tube first end and said heat exchange chamber lower wall.

14. A system in accordance with claim 8 wherein said quench ring further comprises a drain line coupled thereto, said drain line configured to discharge at least a fluid from said system.

* * * * *